United States Patent [19]

Elderton et al.

[11] Patent Number: 4,930,041
[45] Date of Patent: May 29, 1990

[54] POTENTIOMETER POSITION SWITCH CIRCUIT

[75] Inventors: Peter P. Elderton, Fountain Valley; Richard P. Granada, West Covina; Royal E. Howes, Anaheim, all of Calif.

[73] Assignee: ITT Corporation, New York, N.Y.

[21] Appl. No.: 282,365

[22] Filed: Dec. 8, 1988

[51] Int. Cl.$^5$ .............................................. H02H 5/00
[52] U.S. Cl. .................................. 361/190; 323/909; 73/717; 340/825.16; 340/870.16
[58] Field of Search ................ 361/189, 190; 323/909; 73/714, 717, 723, 728, 729, 753, 861.47; 340/825.06, 825.17, 870.03, 870.16

[56] References Cited

U.S. PATENT DOCUMENTS

| | | | |
|---|---|---|---|
| 2,967,504 | 7/1976 | Akeley | 73/861.47 |
| 4,271,701 | 6/1981 | Dempster et al. | 73/717 |
| 4,631,626 | 12/1986 | Bohan, Jr. | 323/909 |
| 4,798,089 | 1/1989 | Frick et al. | 73/717 |

Primary Examiner—A. D. Pellinen
Assistant Examiner—Jeffrey A. Gaffin
Attorney, Agent, or Firm—Menotti J. Lombardi

[57] ABSTRACT

A potentiometer position switch circuit which includes a meter mechanism having a low friction potentiometer coupled to move therewith. The output of the low friction potentiometer is coupled together with the output of a set point potentiometer across the input terminals of a comparator. A magnetic latching double pole, double throw relay having set and reset relay coils is connected to the output of the comparator through the gate of a first voltage operated transistor and through sufficient resistance to minimize current drain and also through an invertor to the gate of a second voltage operated transistor and through a second resistor of sufficient resistance to minimize current drain. The output of the first voltage operated transistor is connected from a second voltage source through the set relay coil to ground and the output of the second voltage operated transistor is connected from a voltage source through said reset relay coil to ground. One set of contacts on the relay are connected to ground the gate on said second transistor when the voltage on the gate of the first transistor is high and to ground the gate on the first transistor when the gate on the second transistor goes high. The other set of contacts are connected to actuate a utilization circuit in one or the other position.

5 Claims, 3 Drawing Sheets 4,930,041

POTENTIOMETER POSITION SWITCH CIRCUIT

BACKGROUND OF THE INVENTION

1. Field of the Invention

This invention relates to a potentiometer position switch circuit and more particularly to an improved circuit employing a low friction potentiometer and low current drain voltage operated transistors to enable increased accuracy due to reduced loading and reduce the current drain on the battery supply.

2. Description of the Prior Art

The prior art known to applicants employs mechanically actuated switches coupled to the dial mechanism of pressure and Δ pressure gauges. Compared to the present invention the prior art has relatively high loading and friction.

In accordance with an aspect of the present invention, it is an object to provide a new and improved low friction potentiometer position switch circuit which may be battery operated and feature long battery life.

Another object is to provide such a circuit employing voltage operated transistors in such a manner as to minimize battery current drain.

SUMMARY OF THE INVENTION

The foregoing and other objects are accomplished by providing a potentiometer position switch circuit in which a meter mechanism has a low friction potentiometer coupled to move therewith. The output of the potentiometer and the output of a set point potentiometer are fed to a voltage comparator. A magnetic latching double pole, double throw relay having set and reset relay coils is connected to the comparator by connecting the output of the comparator to the gate of a first voltage operated transistor through sufficient resistance to minimize current drain and also through an invertor to the gate of the second voltage operated transistor through sufficient resistance to minimize current drain. The output of the first transistor is connected from a voltage source through the set relay coil to ground and the output of the second transistor is connected from the voltage source through the reset relay coil to ground. One set of contacts on the relay is connected to ground the gate on the second transistor when the voltage on the gate of the first transistor is high and to ground the gate on the first transistor when the gate on the second transistor goes high. The other set of contacts on the relay is connected to actuate a utilization circuit in one or the other position.

The potentiometer position switch circuit may also employ a low battery detection circuit including means for producing a low battery output that is alternately low for a relatively long period of time and high for relatively short period when the voltage is low. The low battery output being connected to momentarily reverse the position of the relay.

In an alternate embodiment a 4 to 20 milliamp IC may be connected with its input connected across the output of the low friction potentiometer and the output of a zero adjust potentiometer. The potentiometers being connected across a voltage reference diode. The IC is connected to a source of voltage in a control room and has a low reference current output connected through the reference diode to ground and through a capacitor to ground in order to provide a voltage source.

Other objects, features and advantages of the invention will become apparent from a reading of the specification when taken in conjunction with the drawings.

DETAILED DESCRIPTION OF PREFERRED EMBODIMENT

Figure 1A:
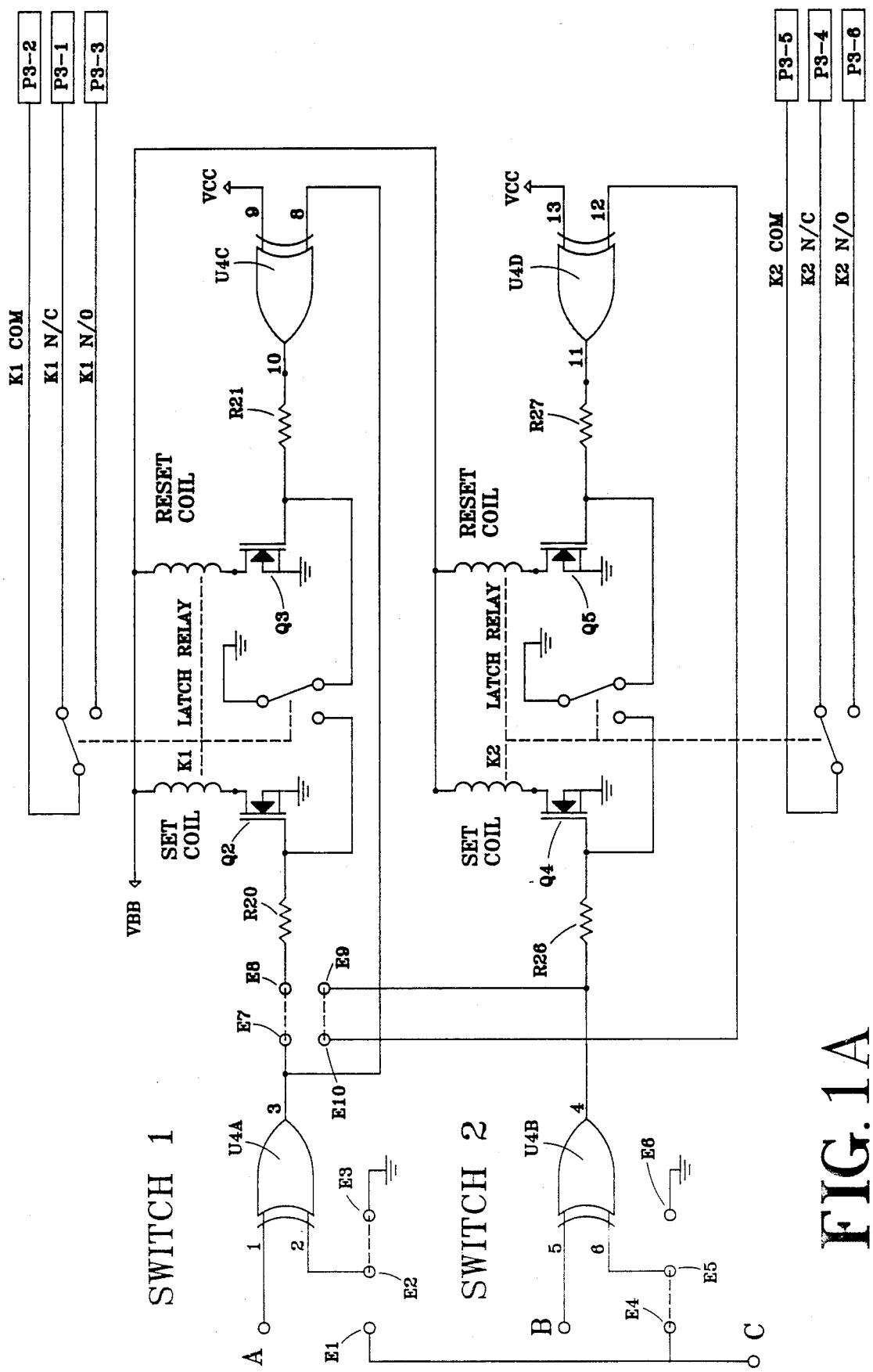
FIG. 1A is a schematic diagram of the switch portion of the circuit.
Figure 1B:
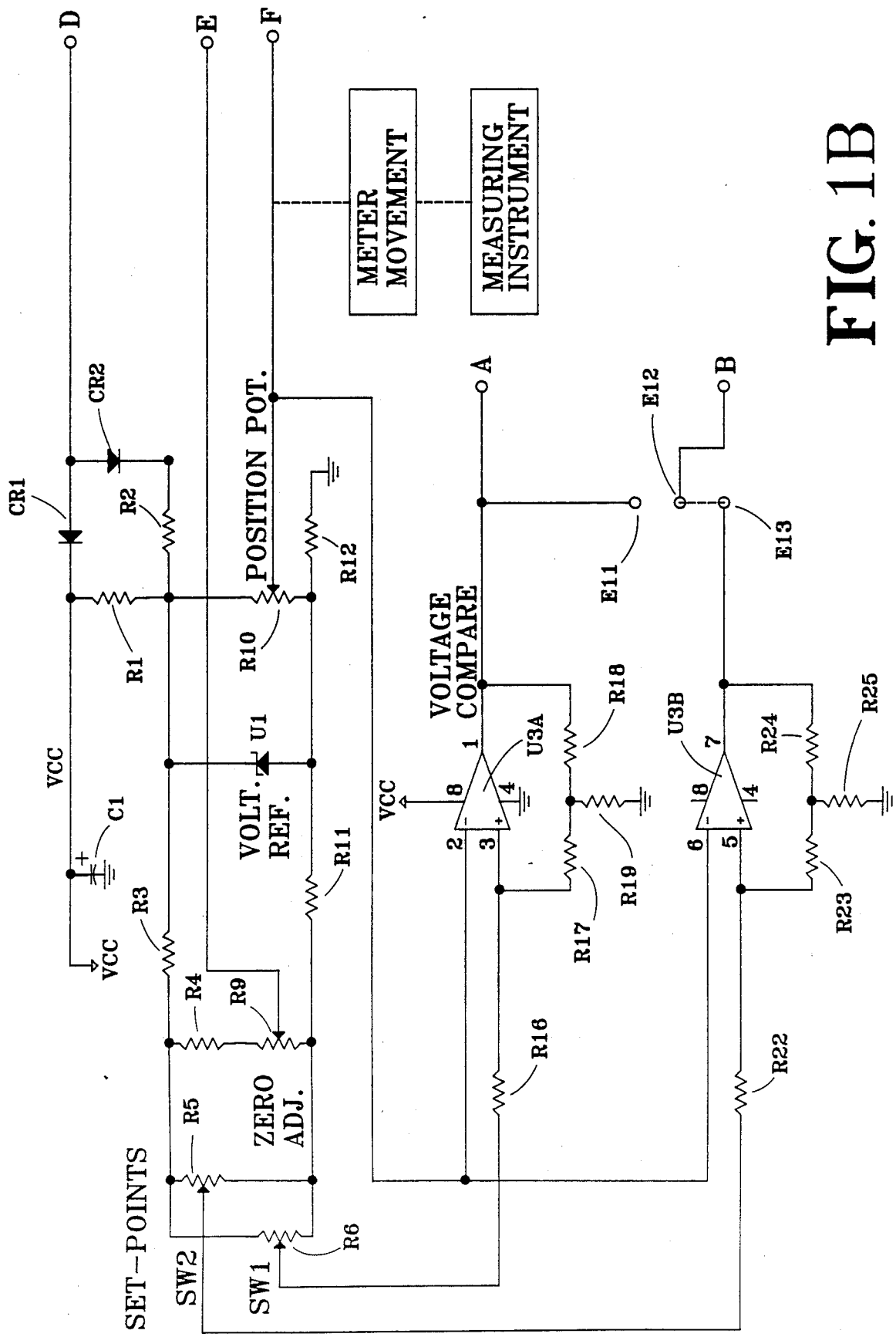
FIG. 1B is a diagram partially in block and partially in schematic form of the potentiometer, set point and voltage comparision portion of the circuit.
Figure 1C:
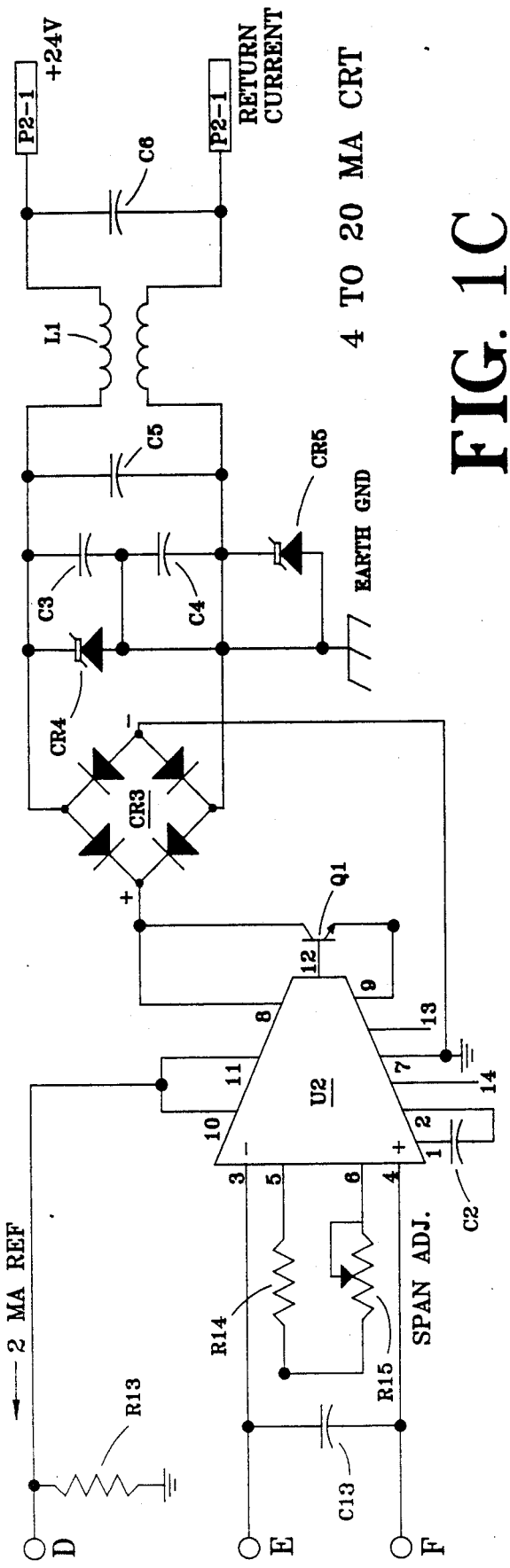
FIG. 1C is a circuit diagram of the 4–20 milliamp portion of the circuit and FIG. 1D is a circuit diagram of the low battery detector portion of the circuit.

Turning to the drawings the circuits disclosed in FIGs. 1A through 1D are interconnected at the terminals designated A through F. Referring to FIG. 1B the block marked measuring instrument and meter movement are shown as mechanically coupled to the wiper of the position pot R10, the measuring instrument mechanically moving the meter movement and the meter movement in turn mechanically moving the wiper on the pot R10. In order to increase the accuracy of the measurement using reduced loading and friction, the pot R10 may be conductive plastic and have a nominal resistance of 20 K plus or minus 10% and a starting torque of 0.015 oz. inches max with a wiper velocity of 600° per second max. Turning next to FIG. 1C the 4–20 milliamp circuit is implemented using U2 which is a 4–20 milliamp integrated circuit XTR 101 provided by Burr-Brown which transforms a voltage between the input pins 3 and 4 into an output current via pins 7 and 8. The ground symbol on pin 7 is for circuit reference only and is not to be confused with system ground at the control room. The +24 volts is referenced to this system ground at the right hand end of FIG. 1C. The return current will flow through a load resistance in the control room to system ground.

The inductor L1 and capacitors C3 through C6 are configured as an EMI filter to prevent high frequencies from entering the circuit from the external wires and causing bias errors. CR4 and CR5 are zener diodes which are used to protect the circuit from voltage transients induced on the external wires. Earth ground is a connection to the metal enclosure sometimes called pipe ground. The diode bridge CR3 enables the circuit to function in the event the input connections are reversed during installation. Transistor Q1 provides a shunt current path which is controlled by U2. Its function is to decrease the power and temperature rise in U2 and thus improve accuracy as recommended by the manufacturer.

U2 furnishes a 2 milliamp reference current from pins 10 and 11. This current is used to power all the circuitry except the relay coils when the 4–20 milliamp loop is energized. When the 4–20 milliamp loop is not energized, all the circuitry associated with the switch function and the low battery detector are powered by the battery illustrated in FIG. 1D, BT1 and BT2.

Proper operation of U2 requires that the input voltages applied to pins 3 and 4 must be within a window of 4–6 volts above ground, pin 7. When the differential voltage between the wiper of the zero adjust pot R9 in FIG. 1B and the wiper of the position pot R10 is zero volts the return current will be four milliamps. This condition corresponds to an indicator reading of zero.

When the indicator reading is full scale this differential voltage is about 0.35 volts and the return current will be 20 milliamps. The position pot R10 rotation is limited to 45° out of a possible 315° by mechanical linkages that drive it. Diodes CR1, CR2 in FIG. 1B and CR7 in FIG. 1D enable the potentionmeters, the switch circuit and the low battery detector circuit to operate from either the 2 milliamp reference current coming out of U2 on terminals 10 and 11 or from the battery BT1 and BT2 in FIG. 1D. When U2 is energized the voltage developed across R13 which is connected from terminals 10 and 11 of U2 to ground is approximately 7.3 volts and the voltage at the cathode of CR1 which is VCC is 6.7 volts. This will back bias CR7 and minimize the current drain from the battery. When U2 is not energized, current from the battery will forward bias CR7 and back bias CR1 and CR2. VCC will then be approximately 5.4 volts.

When the 4–20 milliamps circuit is energized, it is necessary that the voltage across the potentiometer be stabilized since the differential voltage supplied to pins 3 and 4 of U2 is directly proportional. U1, a 2.5 shunt voltage reference to FIG. 1B, serves this purpose. CR2 and R2 provide a path for bias current needed by U1. When the 4–20 milliamp circuit is not energized, the reduced voltage supplied to the network is insufficient to cause U1 to conduct.

Referring now to the switch circuits, the switching of the voltage comparator depends on the position of the position pot R10 of FIG. 1B relative to the set point pot which may be either R5 or R6 in FIG. 1B. Since this is a null measurement, a stable voltage across the potentiometer circuit is not required. When the position pot R10 is upscale from the set point, for example R6 the comparator U3A output will be low. If E2 in FIG. 1A is jumpered to E3 as shown U4A will function as a non-inverting buffer with its output also low. If E7 is jumpered to E8 as shown in FIG. 1A the gate of Q2 will be biased low preventing Q2 from conducting. Since the input to U4C at 8 is low its output will be high. This would bias Q3 in the conducting state except that the gate is grounded by contacts of K1.

When the position pot R10 is down scaled from the set point R6 the comparator U3A output will be high and the output of U4A will be high. The gate of Q2 will charge to the high potential through R20 causing it to conduct current through the set coil of K1 latch relay. K1 will switch the contacts reversing the position shown and short the gate of Q2 to ground. This will cause Q2 to be nonconducting and current will cease flowing through the set coil. The relay is magnetically latched in this state.

The resistor network composed of R16 through R19 in FIG. 1B provides hysteresis for the voltage comparator U3A input. The hysteresis is normally about 3% of FS. The hysteresis can be increased by increasing the value of R19.

Figure 1D:
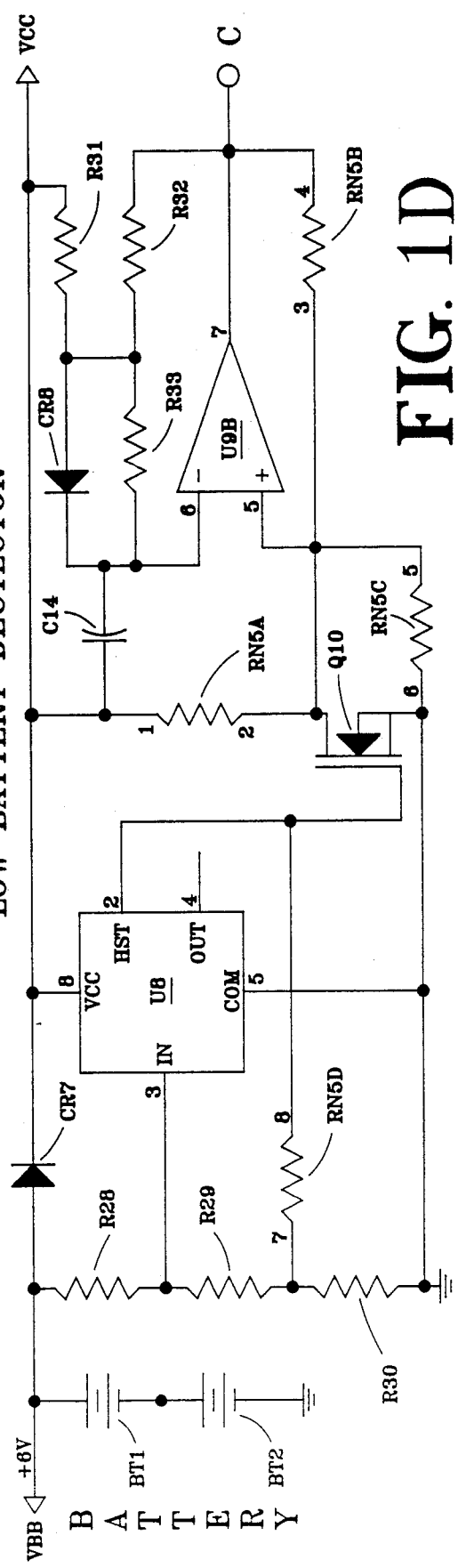

The low battery detector circuit of FIG. 1D uses U8 which has a 1.15 volt reference. When the input at pin 3 of U8 is higher than 1.15 volts the output at pin 2 is high. R28 and R29 divide the battery voltage from the batteries BT1 and BT2 for the input at pin 3. RN5D and R30 add a small amount of hysteresis in series with the voltage divider. With pin 2 of U8 high, Q10 will conduct, effectively grounding the positive input of pin 5 of voltage comparator U9B. The output of U9B on pin 7 will remain at logic low. Under low battery conditions, for example less than 4.7 volts, the output on pin 2 of U8 will be low which will bias Q10 off and effectively disconnect ground from the voltage comparator positive input. U9B is connected as an astable multivibrator which produces an output that alternately is low for 90 seconds and high for 2 seconds. The low period is controlled by C14 and R32+R33. The high period is determined by C14 and R32 since the diode CR8 shunts R33.

The output of the low battery circuit is used to momentarily reverse the position of one or both switches by connecting the circuit to the exclusive-OR circuits U4A and U4B with jumpers E1 to E2 and E4 to E5.

The relay coils require 40 milliamps to change state. This far exceeds the capability of the 2 milliamp reference current available from U2. A large capacitor could store sufficient charge to supply this current but repeated switching at a rapid rate would deplete this charge faster than it could be replenished and the relay could hang up in an in between state where there is no contact to either N/C or N/0. To circumvent this problem, the relay coils are energized from the battery.

A second set point on R5 may be compared with the position potentiometer R10 in the comparator U3B as described above thus providing, for example both a high and a low alarm or actuator circuit. Connecting jumper E11 to E12 instead of E13 slaves switch 2 to switch 1 enabling a second set of relay contacts with a single set point. Jumpering E7 to E8 and E10 to E9, as shown in the schematic, permits operation of the two switches with separate set points. Note that the set points can be in any order. For example, set point 1 can be above or below set point 2 and they can be anywhere between zero and full scale.

Jumpering E7 to E1O and E8 to E9 causes set point 1 to control the reset coil of K1 whereas set point 2 controls the set coil. Similarly, set point 2 controls the reset coil of K2 and set point 1 controls the set coil. This combination provides controller function with an adjustable hysteresis.

Typical values for the components shown in the circuit diagram are as follows:

U1 is an LM 285 - 2.5
U2 is an XTR 101
U3A and B is a TLC3702
U4A and B, C and D, is a 4070
U8 is an ICL8212
U9B is a TLC3702
CR1 and CR2 are 1N914 A's
CR3 is a VM18
CR4 and CR5 are ICTE36's
CR7 and CR8 are IN914 A's
Q1 is a 2N2222
Q2, Q3, Q4, Q5 and Q10 are VN 10K's
C1—1,000μf/10 V
C2, C3, C4 and C5 are .01μf
C6—.01μf/200 V
C13—.1μf
C14—4.7μf
R1—6.65KΩ
R2—8.87KΩ
R3—22.1KΩ
R4—4.99KΩ
R5 and R6—100KΩ pots
R9 a 5KΩ pot
R10 a 20KΩ pot
R11—22.1KΩ
R12—19.1KΩ
R13—4.32KΩ
R14—274Ω

R15—500 ohm pot
R16—100KΩ
R17, and R18—22MΩ
R19, R20 and R21—2.2MΩ
R22—100KΩ
R23 and R24—22MΩ
R25—2.2MΩ
R26 and R27—2.2MΩ
R28—10MΩ
R29—3MΩ
R30—20KΩ
R31—22MΩ
R32—220KΩ
R33—22MΩ
RN5A—RN5D are 4 2.2 mΩ network resistors
L1—5 millihenries
BT-1 and BT-2—BR—⅔A 3V lithium.

Again the circuit is used to replace present mechanically actuated switches coupled to a meter movement such as shown in FIG. 1B which may be, for example, a Barton pressure and delta pressure gage. When a pressure is applied to high and low chambers surrounding bellows, any difference in pressure causes the bellows to move until the spring effect of the unit balances out force thus generated. The linear motion of the bellows which is proportional to the differential pressure is transmitted as a rotary motion through the torque tube assembly. For a direct functional replacement in such a unit external power may not be available and the circuit is battery operated and features long battery life. Novelty resides in the method of operating DPDT magnetic latching relays so as to minimize battery current drain. One set of the relay contacts in FIG. 1A are used to turn off the MOS transistors Q2 through Q5 that energize the relay windings after the relay switch is positioned. In the circuit shown the wiper of R10 is mechanically coupled to the dial mechanism or meter movement. The adjustment of R5 or R6 represents a switch setting desired. The output of U3A pin I will be at ground potential if the voltage potential of the wiper of R10 is more than a few millivolts more positive than the wiper of R6, R16, 17, 18 and 19 providing a small hysteresis. E7 and E8 are shorted as are E9 and E10 for purposes of this discussion. If U3A pin I is at ground then U4A pin 3 will be high and U4C pin 10 will be at ground. With the relay contacts positioned as shown, the gate of Q2 will charge positively causing Q2 to conduct energizing the set coil of K1. This action will cause the relay of the switch from the state shown to the closing of the contacts, grounding the gate of Q2. The gate of Q3 will remain at ground since the output of U4C is at ground. With the gate of Q2 grounded by the relay contacts current will flow through R20. To minimize this drain on the battery R20 is made as large as practical. U3A, U3B, U4A and U4B are CMOS circuits and consume very little current. The potentiometers are the major current drain on the battery. One ampere hour of battery life is sufficient to switch the relays many millions of times.

While a particular embodiment of the invention has been described, it will be understood of course that it is not intended to limit the invention thereto since many modifications may be made. It is therefore contemplated by the appended claims to cover any such modifications as fall within the true spirit and scope of the invention.

What is claimed is new and desired to be secured by letters patent of the United States is:

1. A potentiometer position switch circuit comprising a meter mechanism,
    a low friction potentiometer coupled to move with said meter mechanism and having input terminals and output terminals,
    a set point potentiometer having input and output terminals,
    a first source of voltage, means connecting said first source across the input terminals of said low friction and set point potentiometers,
    a voltage comparator having input terminals and an output terminal,
    means connecting the output of said low friction potentiometer to one input terminal of said comparator and the output of said set point potentiometer to the other input terminal of said comparator,
    a magnetic latching double pole, double throw relay having set and reset relay coils,
    means connecting the output of said comparator to the gate of a first voltage operated transistor through sufficient resistors to minimize current drain and through an inverter to the gate of a second voltage operated transistor through sufficient resistance to minimize current drain,
    the output of said first transistor being connected from a second voltage source through said set relay coil to ground and the output of said second transistor being connected from said second voltage source through said reset relay coil to ground,
    one set of contacts on said relay being connected to ground the gate on said second transistor when the voltage on the gate on said first transistor is high and to ground the gate on said first transistor when the gate on said second transistor goes high and the other set of contacts being connected to actuate a utilization circuit in one or the other positions.

2. The potentiometer position switch circuit of claim 1 in which said low friction potentiometer is made of a conductive plastic.

3. The potentiometer position switch circuit of claim 1 including a second set point potentiometer,
    a second voltage comparator,
    a second magnetic latching double pole, double throw relay,
    third and fourth voltage operated transistors,
    and having input and output terminals on said second comparator with means connecting the output of said low friction potentiometer to one input terminal of said comparator and the output of said second set point potentiometer to the other input terminal of said second comparator and with the remainder of the circuit after said second comparator duplicating the circuit after said first comparator in order to actuate said second double pole, double throw relay from said second set point potentiometer in the identical manner of said first double pole, double throw relay.

4. The circuit of claim 1 including a low battery detection circuit wherein said second voltage source is a battery and said detection circuit includes means for producing a low battery output that is alternately low for a relatively long period of time and high for a relatively short period when the voltage of said second voltage source is low,
    low battery output being connected to momentarily reverse the position of said relay.

5. The circuit of claim 1 including a 4–20 milliamp integrated circuit having an input connected across the output of said low friction potentiometer and the output of a zero adjust potentiometer,
  said zero adjust potentiometer being connected across a voltage reference dial,
  said integrated circuit being connected to a source of voltage in a control room and having a low reference current output connected through said reference diode to ground and through a capacitor to ground in order to provide said first voltage source.

* * * * *